May 8, 1928.
J. C. FISCHER
1,669,192
HOSPITAL APPLIANCE
Filed June 12, 1926  2 Sheets-Sheet 1
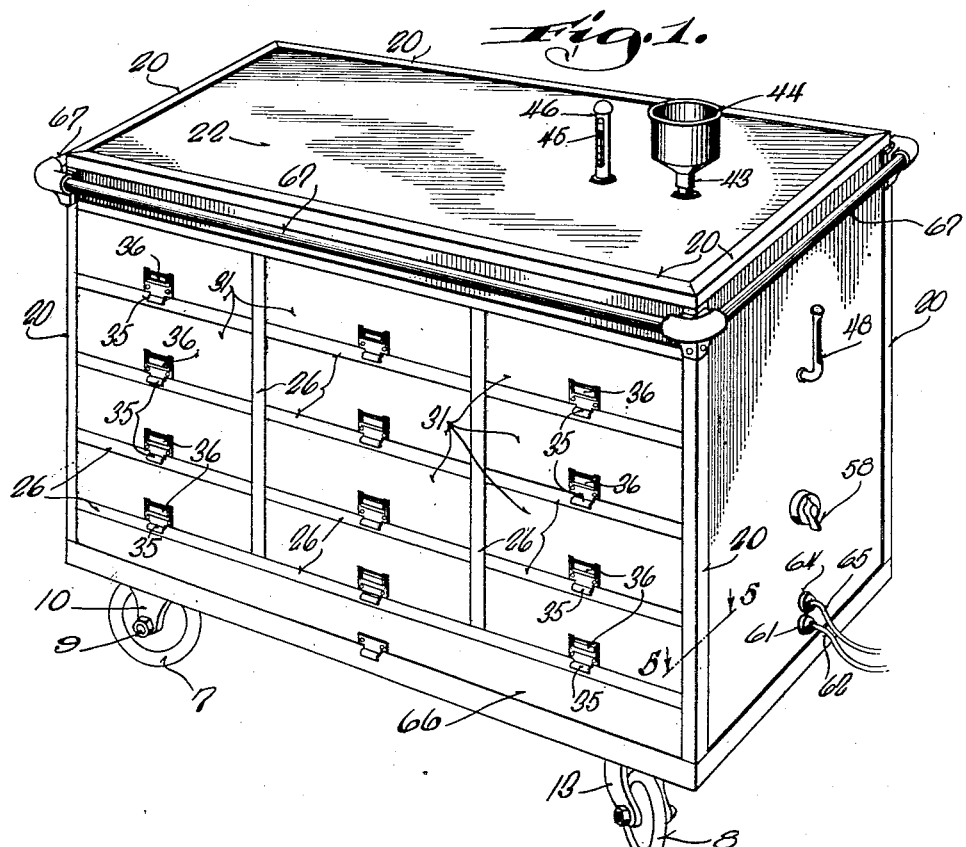
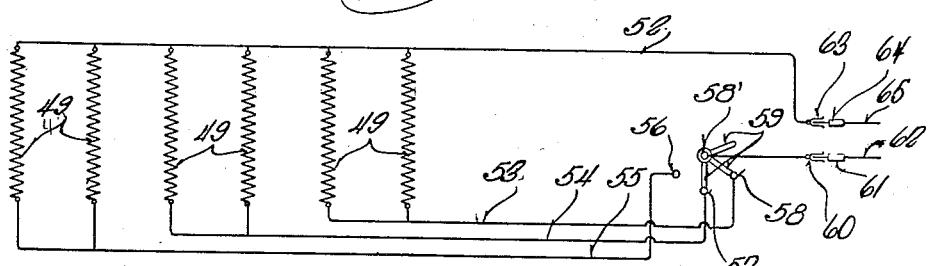
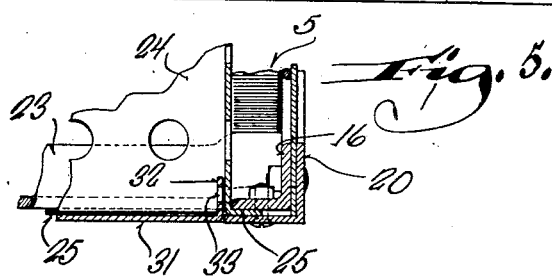
Joseph C. Fischer

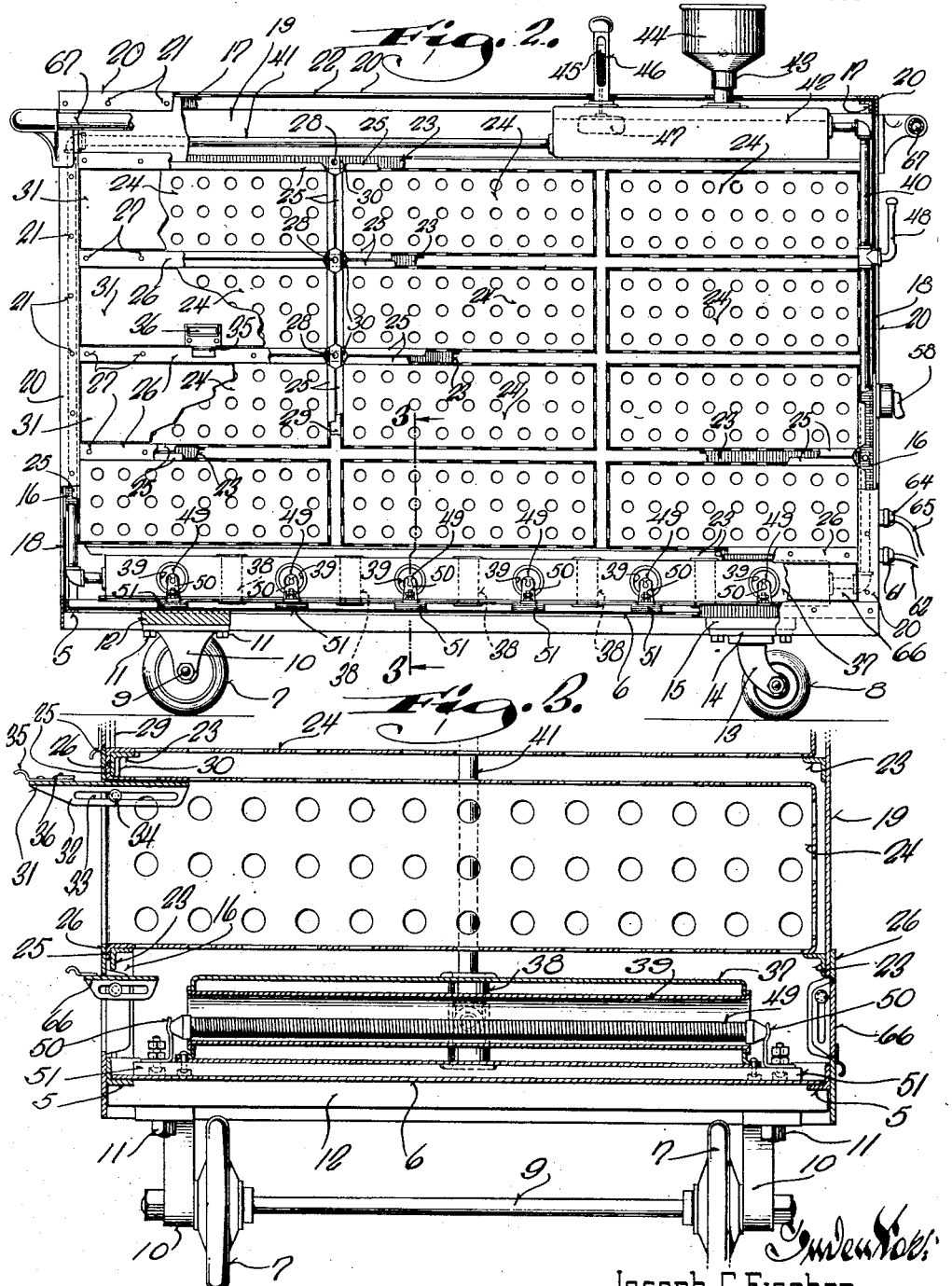

Patented May 8, 1928.

1,669,192

UNITED STATES PATENT OFFICE.

JOSEPH C. FISCHER, OF WAUWATOSA, WISCONSIN, ASSIGNOR OF ONE-THIRD TO WESLEY J. HANSEN AND ONE-THIRD TO GLENFORD L. BELLIS, BOTH OF WAUWATOSA, WISCONSIN.

HOSPITAL APPLIANCE.

Application filed June 12, 1926. Serial No. 115,560.

This invention relates to certain new and useful improvements in hospital appliances and refers more particularly as to what may be described as a distributing cart especially designed for use in sanitariums, hospitals and the like for distributing food from the kitchen or other central point to the individual rooms or wards.

Various devices have been provided for maintaining the temperature of food while being distributed, all of which have been open to several objections, such as the lack of separate compartments for the respective meals and the inability of maintaining the temperature of the carrier substantially uniform.

This invention contemplates as one of its objects the provision of an improved carrier of the character described having a plurality of separate compartments, each provided with a door permitting access to its interior and having provisions for indicating thereon the designation of its contents.

Another object of this invention resides in the provision of an improved carrier of the character described having its interior divided into a plurality of separate compartments by means of perforated partitions whereby the unrestricted circulation of heat through the respective compartments is permitted.

Another object of this invention resides in the provision of an improved heating system for an appliance of the character described wherein a water chamber is provided with tubular stay bolts forming heating chambers for receiving renewable heating elements.

A further object of this invention resides in the provision of an improved heating system for an appliance of the character described wherein various degrees of heat may be obtained and whereby the temperature and level of the water in the system is constantly indicated.

A still further object of this invention resides in an improved device of the character described which is very simple in construction, effective in operation and neat in appearance.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a perspective view of a carrier or cart embodying my invention;

Figure 2 is a view, partly in front elevation and partly in section, illustrating the interior of my improved carrier;

Figure 3 is a fragmentary view, partly in elevation and partly in section, taken through Figure 2 on the plane of the line 2—2 and illustrating the manner of mounting the heating elements;

Figure 4 is a diagrammatic view illustrating the circuits for the heating element, and Figure 5 is a fragmentary sectional view taken through Figure 1 on the plane of the line 5—5.

Referring now more particularly to the accompanying drawings, in which like numerals designate like parts throughout the several views, 5 designates a rectangular frame, preferably formed of angle irons, closed by a bottom plate 6 and supported from two pairs of wheels 7 and 8. The wheels 7 are mounted on an axle 9 carried by standards or supports 10 secured, as at 11, to a beam 12 connecting the side members of the frame 5 adjacent one end and the wheels 8 are of the caster type journaled between forks 13 rotatably carried by plates 14 fixed to a beam 15 connecting the side members of the frame 5 adjacent their other ends.

Angle iron, standards or members 16 extend upwardly from each corner of frame 5 and are connected at their upper ends by an inverted rectangular frame 17 of a shape and size similar to the frame 5, side and rear walls 18 and 19, respectively, being secured to the skeleton cage formed by the frames 5, 17 and uprights 16 by having their marginal edges confined between the flanges of the respective angle irons and exterior angle irons 20 fitted thereover and secured thereto, as at 21, as best shown in Figures 2 and 5. A plate 22 covers the frame 17 to provide a top for the carrier.

The forward and rear standards 16 are connected by series of horizontal angle members 23 from which rectangular receptacles or boxes 24 are supported. The boxes 24 are preferably formed of perforated material having their front ends open and surrounded by a lateral flange 25 adapted to be confined between the adjacent angle irons 23 and finishing strips 26, as clearly illustrated in the drawings. The horizontal finishing strips 26 are riveted or otherwise secured to the front angle members 23, as at 27, and the vertical finishing strips are riveted or otherwise secured, as at 28, to vertical braces or bars 29 engaging the inner surfaces of the vertical flanges 25. The outer vertical flanges of the topmost boxes 24 are clamped between the forward vertical standard 16 and the endmost vertical finishing angle member 20. The horizontal angle irons 23 are preferably bulged or struck inwardly at the point they cross the bars or strips 29, as at 30.

Access is had to the interior of the receptacles 24 through their outer open ends which are normally closed by doors 31 of suitable construction. In the present instance, each door 31 has its sides flanged, as at 32, and provided with elongated slots 33 for receiving bearing studs 34 mounted at the outer, uppermost corners of the receptacle side walls, so that the doors may be swung to a substantial horizontal position and then shifted inwardly, as best shown in Figure 3, the rear end thereof engaging the top wall of its receptacle to retain the same open. A suitable handle member 35 is mounted on the free end of each door for convenience in opening and closing the same and preferably carries a pocket 36 to receive a card giving the destination of the contents of the compartment.

The top, bottom and side walls of the receptacles are slightly spaced from each other and the rear walls thereof are spaced from the carrier rear wall 19 to permit the free circulation of air through all the receptacles. Mounted beneath the receptacles is an elongated tank 37, having its top and bottom walls braced by vertical stay bolts 38 and its side walls braced by transverse, tubular stay bolts 39. The tank 37 is incorporated in a circulating system including pipes 40 and 41 leading from opposite ends thereof to a tank 42 located above the topmost receptacle, the pipe 41 preferably entering the tank 42 at a lower point than pipe 40 so that the direction of circulation is from tank 37, through pipe 40, returning to tank 37 through pipe 41.

The tank 42 has a filling opening 43 provided with a funnel shaped spout 44 to facilitate the filling of the system and form an expansion chamber to accommodate for the expansion of the fluid in the system. The level of water within the system is visually indicated by an indicating rod 45 working in a tube 46 and connected with a float 47, the tube 46 having a glass front through which the rod is visible to cooperate with graduations on the tube. A thermometer 48 is preferably connected with the pipe 40 and is located exteriorly of the carrier to indicate the temperature of the circulating water.

The water within the system is heated by a series of elements 49 preferably mounted within the tubular stay bolts 39, being, in the present instance, cartridge-like electric heating units removably secured between two spring contact clips 50 mounted on each end of cross pieces 51, preferably of insulating material and located one beneath each stay bolt 39. The cross pieces 51 are further secured to the tank 37, as at 51', thereby making the tank and its heating elements substantially a unit which rests on the bottom plate 6 of the cart. With this construction any accidental shifting of the tank 37 will not affect the alignment of the heating elements and the tubular stay bolts 39.

The spring contacts at one side of the tank 37 are connected by a common conductor 52 and the contact clips at the other side of the tank are preferably connected in pairs, by conductors 53, 54 and 55 leading to switch contacts 56, 57 and 58, respectively.

Three pairs of heating elements have been illustrated, although it will be understood that the number may be varied to suit any particular installation. A movable switch member 58' carrying as many switch arms 59 as there are grouped resistor elements is provided to complete the continuity of the circuit of any number of groups of heating elements, the switch member 58' being electrically connected with a socket 60 with which a plug 61 carrying a main service line 62 is engageable and the conductor 52 being electrically connected with a socket 63 with which a plug 64 carrying a main service line 65 is engageable.

Access is had to the space in which the tank 37 and the heating elements are mounted through a door 66 extending for the entire length of the cart so that the elements may be readily renewed from time to time if necessary. The door 60 is similar in construction to the doors 31 and, therefore, further detail description thereof is deemed unnecessary. A guard rail 67 extends about the upper portion of the carrier or cart and provides means for moving the carrier from place to place.

When it is desired to place the carrier in use, the service lines 62 and 65 are connected with the system and the switch member 58 turned to incorporate all of the heating elements within the circuit, as a result of which the water within the tank 37 rapidly heats, bringing the temperature of the compartments up to a desired degree. After the desired temperature is obtained, the switch member 58 may be operated to cut out any number of the heating elements, if desired. The food to be distributed is then placed in the various receptacles and the lines 62 and 65 disconnected after swinging the switch member 58 to "off" position to permit the movement of the cart to any location.

The water within the tank 37 maintains the various receptacles at the desired temperature while being moved from the kitchen or other central point and if desired the heating elements may be again connected with the service lines in the corridor or ward while the receptacles are being emptied. Each receptacle being entirely independent of the other prevents the undue loss of heat such as would occur were a single door provided for all or any number of receptacles.

From the foregoing description taken in connection with the accompanying drawings it will be readily apparent to those skilled in the art to which an invention of this character appertains that I provide an improved carrier which is especially desirable for use in hospitals and sanitariums, which has means for economically and efficiently maintaining the food at the desired temperature, which is so constructed mechanically as to permit ready repairs when necessary and which is safeguarded against over-heating by providing a blow-off or expansion chamber.

What I claim as my invention is:

1. An appliance of the character described, comprising a casing adapted to be readily moved from place to place, a plurality of perforated receptacles, located within the casing, a door for each receptacle, and means for heating the interior of the casing and consequently the interior of the receptacles.

2. An appliance of the character described, comprising a casing adapted to be readily moved from place to place, a plurality of perforated receptacles located within the casing, a door for each receptacle, and means for heating the interior of the casing, the receptacles being spaced from each other to permit the free circulation of air therethrough.

3. An appliance of the character described, comprising a casing, and a heating system for the casing including a tank located in the upper and lower portions of the casing, pipes connecting adjacent ends of the tanks, the pipes entering the upper tank at different levels whereby water within the system, when heated, has a positive direction of circulation and means for heating the water in one tank.

4. An appliance of the character described, comprising a casing, and a heating system for the casing including an expansion tank mounted in the upper portion of the casing, a heating tank mounted in the lower portion of the casing, pipes connecting adjacent ends of the tanks, the pipes entering the upper tank at different levels whereby water within the system, when heated, has a positive direction of circulation and means for heating the water in the lower tank.

5. An appliance of the character described, comprising a casing, and a heating system for the casing including tanks located one in the upper and one in the lower portion of the casing, pipes connecting adjacent ends of the tanks, the pipes entering the upper tank at different levels whereby water within the system, when heated, has a positive direction of circulation, means for heating the water in the lower tank, and a blow-off and expansion chamber connected with the upper tank.

6. An appliance of the character described, comprising a casing, and a heating system for the casing including tanks located one in the upper and one in the lower portion of the casing, pipes connecting adjacent ends of the tanks, the pipes entering the upper tank at different levels whereby water within the system, when heated, has a positive direction of circulation, means for heating the water in the lower tank, a blow-off and expansion chamber connected with the upper tank, and means for indicating the level of water within the system.

7. An appliance of the character described comprising a casing, and a heating system for the casing including tanks located one in the upper and one in the lower portion of the casing, pipes connecting adjacent ends of the tanks, the pipes entering the upper tank at different levels whereby water within the system, when heated, has a positive direction of circulation, means for heating the water in the lower tank, a blow-off and expansion chamber connected with the upper tank, means for indicating the level of water within the system, and means for indicating the temperature of the water in the system.

8. In an appliance of the character described, a heater tank, a plurality of open ended, tubular stay bolts connecting the side walls of the tank, and heating elements readily removably disposed in the stay bolts, said heating elements being spaced from the walls of the tubular stay bolts to permit the circulation of air therebetween.

9. In an appliance of the character described, a heater tank, a plurality of open ended, tubular stay bolts connecting the side walls of the tank, heating elements disposed in the stay bolts, and means for connecting and disconnecting certain of the heating elements from a source of energy.

10. In an appliance of the character described, a heater tank, a plurality of open ended tubular stay bolts connecting the side walls of the tank, a contact clip member mounted adjacent each end of the stay bolts, heating elements removably secured in the stay bolts by the contact clips, and circuits connecting the heating elements.

In testimony whereof I affix my signature.

JOSEPH C. FISCHER.